United States Patent [19]

Hughes et al.

[11] 4,429,714
[45] Feb. 7, 1984

[54] CONTROL VALVE

[75] Inventors: Allan B. Hughes, Wilmington, Del.; Terrence A. Dear, Elkton, Md.

[73] Assignee: E. I. Du Pont de Nemours & Co., Wilmington, Del.

[21] Appl. No.: 290,081

[22] Filed: Aug. 3, 1981

[51] Int. Cl.³ .................... F16K 47/14; F16K 47/02
[52] U.S. Cl. ............................. 137/625.3; 137/625.37; 251/127; 138/41; 138/42
[58] Field of Search .................. 137/625.3, 625.37; 251/127; 138/41, 42

[56] References Cited

U.S. PATENT DOCUMENTS

| 3,513,864 | 5/1970 | Self | 137/14 |
|---|---|---|---|
| 3,631,891 | 1/1972 | Brumm | 137/625.3 |
| 3,690,344 | 9/1972 | Brumm | 137/625.28 |
| 3,802,537 | 4/1974 | White | 181/36 R |
| 3,977,435 | 8/1976 | Bates | 137/625.3 |
| 4,205,696 | 6/1980 | Gongwer | 137/1 |

Primary Examiner—Arnold Rosenthal

[57] ABSTRACT

A flow control valve having a flow-dividing cage surrounding its plug. The cage includes stacked plates spaced by dependent legs and annular screens in the spaces between adjacent plates.

4 Claims, 7 Drawing Figures 4,429,714

CONTROL VALVE

BACKGROUND

This invention relates generally to the control of a high pressure fluid and, more particularly, to valves used to achieve pressure drops in a fluid flow line.

It is known in the art that several problems, including objectionable noise, are generated by the increase in velocity that follows from the reduction in pressure as expanding pressurized fluid flows through the orifice in a control valve. Put differently, fluctuations in flow through the orifice have a marked influence on the production, frequency and intensity of noise. Attempted solutions have included various devices for subdividing and confining the fluid in its flow through the orifice. Such devices are referred to as low noise trim and usually require an increase in the size of the valve for a given installation. For example, in U.S. Pat. No. 3,513,864 to Self, a stack of skeletal and imperforate discs is positioned as a cage around the valve plug. With such a cage, the number and length of tortuous paths required to achieve a desired pressure drop dictate a very large surface area and, therefore, a valve that is disproportionately large for the associated pipes. Another device, in the form of sandwiched discs and screens surrounding a conduit for a valving piston, is shown schematically in FIG. 3 of U.S. Pat. No. 3,802,537 to White. In such a device, flow through perforations in the conduit would create turbulence and noise. Restricted flow through the perforations would also create back pressure, thus achieving a less effective flow across the screens.

SUMMARY

The above and other limitations have been overcome and the level of noise has been reduced appreciably in a valve that includes a body with a through passage, a seat in the passage and a plug movable toward and away from the seat. The plug moves within a cage containing a stack of annular plates and an annular screen constrained between each pair of adjacent plates. The distance between plates is maintained by short legs projecting from one side of each plate adjacent its inner and outer edges. Each screen is positioned between the inner and outer legs of one plate. The inner and outer legs are staggered circumferentially. Thus, there is an annular duct between each pair of plates and it is interrupted only by legs and a screen.

DRAWINGS

Various objectives and advantages will be apparent from the following description wherein reference is made to the accompanying drawings in which FIG. 1 is a cross section of the control valve of the present invention;

DESCRIPTION

Figure 1:
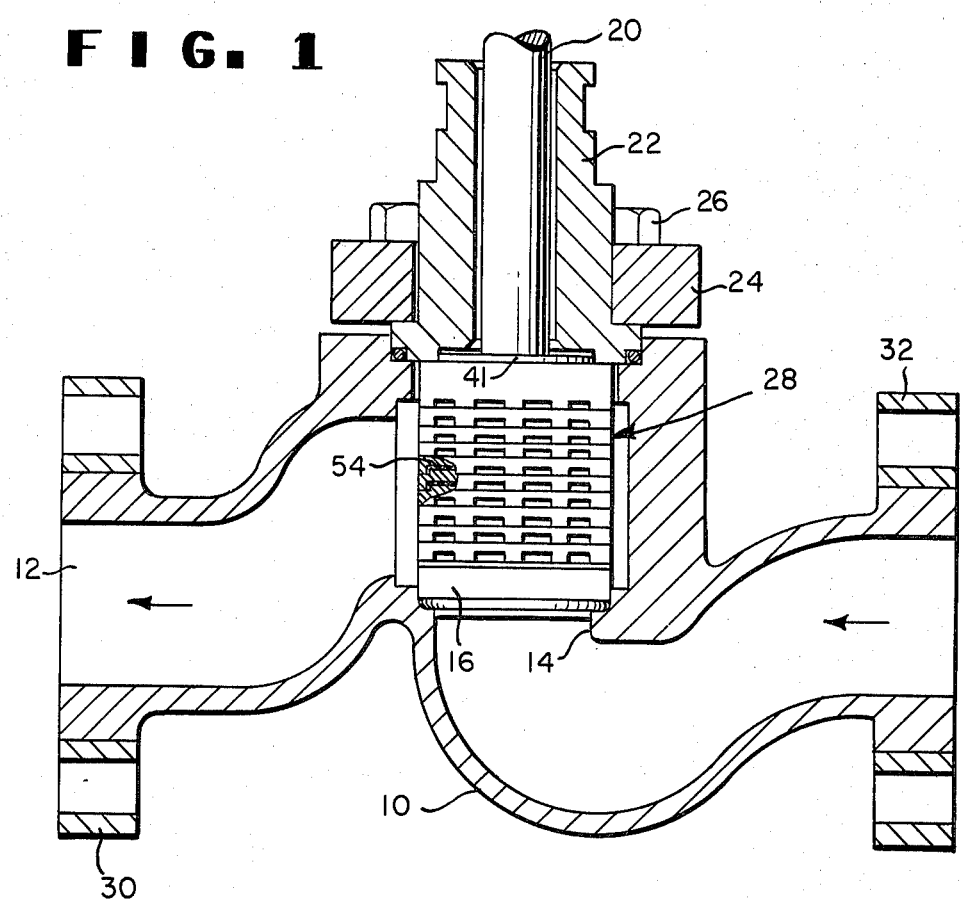

The improvements of the present invention have been incorporated into a globe valve (FIG. 1) having a body 10 provided with a through passage 12. In body 10, where passage 12 changes direction, there is a bridge 14 that receives a seat ring 16. Ring 16 is shaped to receive the end of a plug 18 (FIG. 2) when the flow through passage 12 is to be interrupted. The plug is on the end of a stem 20. The stem projects from body 10 through a bonnet 22. Bonnet 22 is held in place by a bonnet flange 24 and cap screws 26. A cage 28 fits between bonnet 22 and seat ring 16. At the ends of passage 12, body 10 has flanges 30,32 adapted for attachment to other flanges or elements in a fluid flow line.

Figure 2:
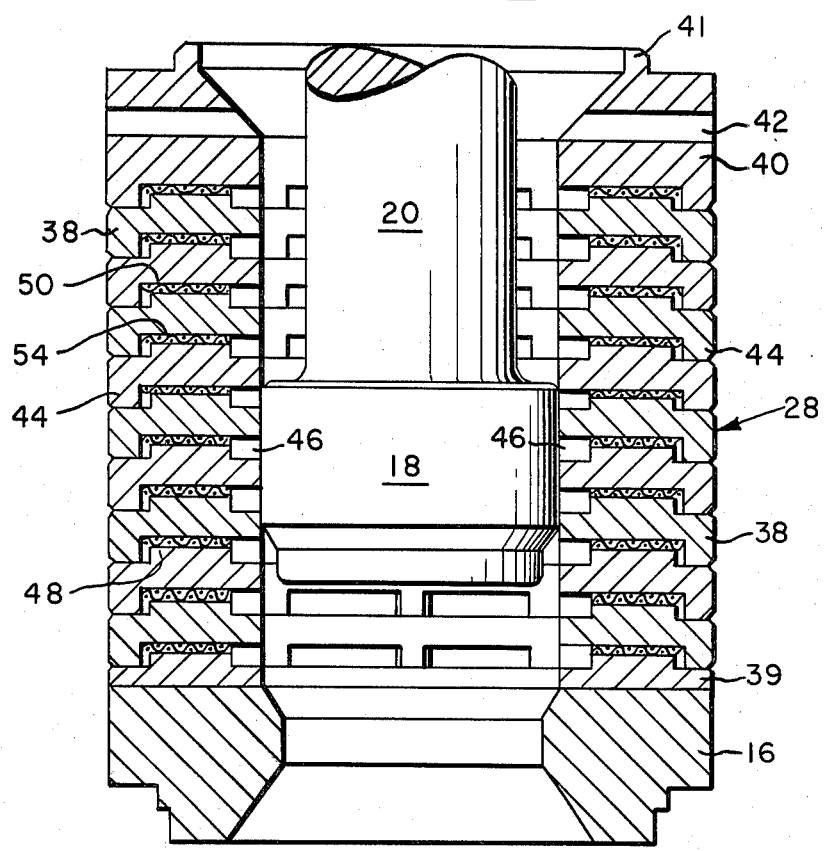
FIG. 2 is an enlarged cross section of the cage shown in FIG. 1.
Figure 3:
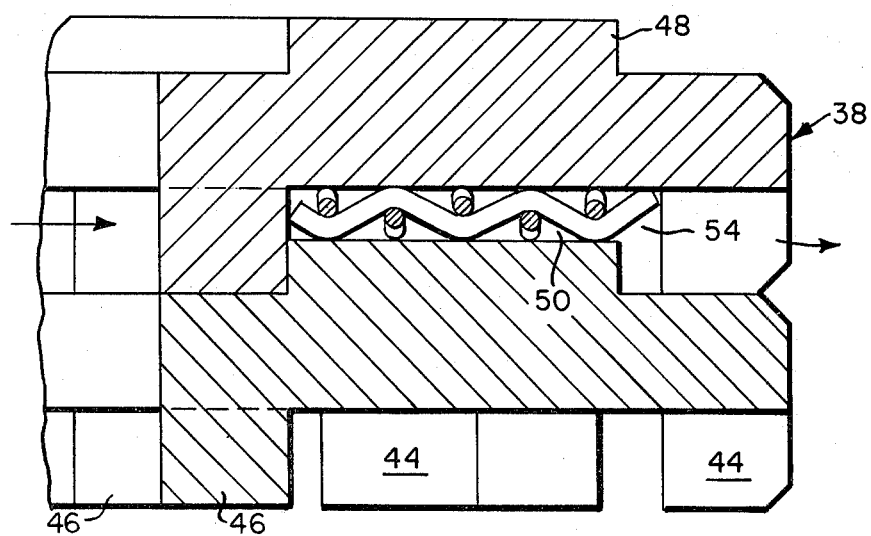
FIG. 3 is a fragmentary, enlarged, sectional view of the cage shown in FIG. 2, taken in the direction and at the location indicated by line III—III in FIG. 4.

As shown in FIGS. 2 and 3, cage 28 includes a plurality of identical, annular, table-like plates 38 stacked between a lower end plate 39 and an upper end plate 40. Lower plate 39 engages seat ring 16 and the upper side of plate 40 has an annular lip 41 that fits in a seat on the lower end of bonnet 22 (FIG. 1). Plate 40 has vent ports 42 for balancing the forces on plug 18 when it is in an open position. Its lower surface is shaped the same as the lower sides of plates 38. Similarly, the upper surface of plate 39 is shaped the same as the upper sides of plates 38.

Figure 4:
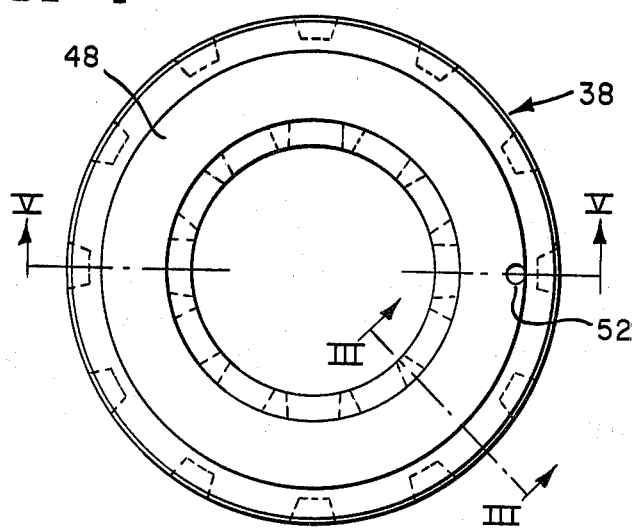
FIGS. 4-6 are top, sectional and bottom views of a pair of the plates in the cage shown in FIGS. 1-3, FIG. 5 having been taken on line V—V in FIG. 4.
Figure 5:
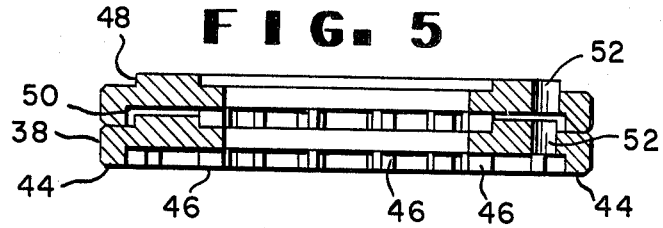
Figure 6:
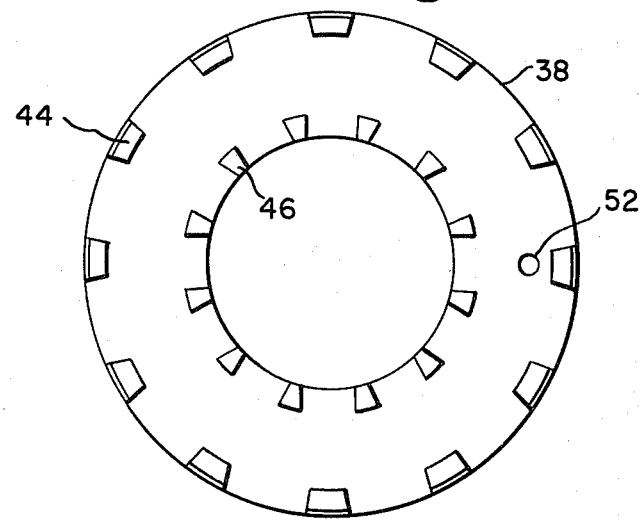

As best shown in FIGS. 4-6, the lower side of each annular plate 38 has equal numbers of integral, equispaced, short, narrow, dependent legs 44,46 adjacent its outer and inner edges, respectively. Legs 44 are staggered with respect to legs 46 in that each is located angularly between a pair of legs 46. On its upper side, each plate 38 is recessed at its inner and outer edges to present an annular, integral ring or ledge 48. Each ledge 48 protrudes from its plate to a lesser extent than the legs 44,46 of the adjacent plate, thus defining an annular duct 50 (FIG. 5) interrupted only by legs 44,46, i.e., the depth of duct 50 is determined by the height of legs 44,46. Legs 46 engage the inner edges of ledges 48. At the outer edge of each ledge 48, there is a through hole 52 for an indexing pin with which the plates are aligned as cage 28 is assembled. The plates are otherwise imperforate.

Referring again to FIGS. 2 and 3, there is an annular screen 54 positioned in each duct 50. Each screen extends radially from inner legs 46 to outer legs 44. Each screen 54 is retained and held in place by its contacts with the legs and the adjacent plates. In an assembled cage 28, each duct 50 is interrupted only by the fine, wire screen 54 and narrow legs 44,46. The height of legs 44,46 and, therefore, the depth of duct 50, is dependent on and slightly less than the thickness of the screens, i.e., the screens are preloaded.

Figure 7:
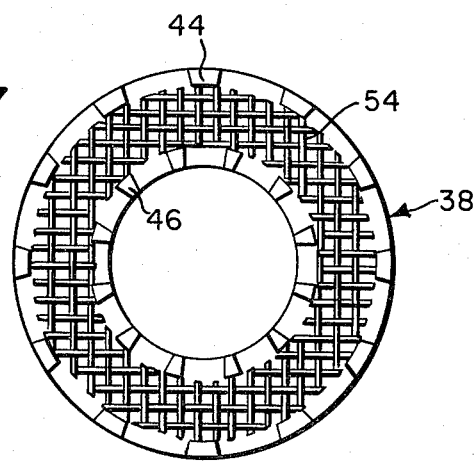
FIG. 7 is another bottom view of a plate with a screen in place.

As indicated by arrows in FIGS. 1 and 3, pressurized fluid, whether a gas or a liquid, flows into the valve at flange fitting 32 and through the orifice in seat ring 16 to the interior of cage 28. The cylindrical surface of plug 18 engages the inner surfaces of plates 38. Depending on the position of the plug, the fluid passes outwardly through one or more of the ducts 50 to a flow line beyond flange 30. The progressive increase in the area of the ducts in the direction of flow yields a progressive, volumetric expansion of a gas as well as a progressive damping effect on fluid velocity and practically eliminates vena contracta effects downstream of the valve orifice. Flow through ducts 50 is along the random paths of the wires in screens 54. It will be apparent on inspection of FIG. 7 that those paths differ on successive radii in each quadrant of the screen. Thus, although the flow is random, it is balanced overall.

Integrity of the assembled cage during operation is assured by the clamping effect of bonnet 22, the engagement of annular lip 41 on plate 40 in the seat on bonnet 22 and the engagement of legs 46 with ledges 48. Thus, any tendencies toward lateral or vertical displacements of the plates 38 or the screens 54 responsive to the pressure of the fluid flowing through open ducts 50 is avoided. Consequently, there is no opportunity for lateral buckling of any screens 54 or deformation by compression of screens in closed ducts 50.

An unmodified globe valve was tested against valves equipped with cages 28 of the type disclosed herein. Metallic screens 54 of various meshes (14, 20, 30 and 40) were used. Reductions in the level of noise radiating from the valve body and through the connected piping were noted in all of the comparisons but the noise levels observed with the 20 and 30 mesh screens, under the chosen flow conditions of pressure and capacity (Cv), were significantly lower. With the 40 mesh screen in place, the flow was restricted (low Cv) whereas, with the 14 mesh screen, the opposite effect was noted.

When noise generation by the obstructions or orifices introduced in pressure control valve trims is considered, the size of the vortices or eddies shed by each orifice ("turbulence balls") and the interaction of the turbulence balls are extremely important and relevant to the net noise reduction that can be achieved. It has been found that when the turbulence ball size is substantially reduced under controlled circumstances and when these significantly smaller turbulence elements interact in a confined region of the flow, a significant portion of the fluid borne and generated turbulence is reabsorbed in the flow. This improvement is evidenced by an increased noise reduction or insertion loss along the flow path.

It is believed that use of wire mesh on its edge significantly enhances the reduction of turbulence ball size, thereby promoting reabsorption of sound, as compared to the ineffectiveness in this regard of frictional labyrinth path designs and/or those involving contractions and expansions of flow in sequentially spaced orifices. The selection of fineness of the wire and mesh size thus facilitates controlling the turbulence ball size and interaction and, therefore, the amount of sound that can be reabsorbed in the flow ducts formed by the edge-mesh and the other geometric design aspects of the plates disclosed herein.

What is claimed as new and desired to be secured by Letters Patent is:

1. In a valve including a body with a passage therethrough, a seat in the passage and a plug movable toward and away from the seat, a cage surrounding the plug, said cage comprising: a stack of annular plates and an annular wire screen between each pair of adjacent plates, the plates having spaced legs projecting from one side adjacent the inner and outer edges thereof, each screen also being located between the inner and outer legs of one plate.

2. The valve of claim 1 wherein the legs are narrow and the inner legs are staggered angularly with respect to the outer legs on each plate.

3. The valve of claim 2 wherein is provided an annular ledge on the other side of each plate, each screen being on a ledge, there being an annular duct between each pair of adjacent plates interrupted only by a screen and the legs on one of the plates.

4. The valve of claim 3 wherein each screen is constrained by the legs and a pair of plates in a preloaded condition.

* * * * *